United States Patent
Bang et al.

(10) Patent No.: US 8,442,393 B2
(45) Date of Patent: May 14, 2013

(54) SHAKE CORRECTION APPARATUS IN DIGITAL CAMERA

(75) Inventors: Jin-young Bang, Yongin-si (KR); Kwang-seok Byon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 12/902,319

(22) Filed: Oct. 12, 2010

(65) Prior Publication Data

US 2011/0103781 A1 May 5, 2011

(30) Foreign Application Priority Data

Oct. 30, 2009 (KR) .................. 10-2009-0104211

(51) Int. Cl.
*G03B 17/00* (2006.01)

(52) U.S. Cl.
USPC .......................................................... 396/55

(58) Field of Classification Search ............ 396/55
See application file for complete search history.

(56) References Cited

U.S. PATENT DOCUMENTS

| 6,407,771 B1* | 6/2002 | Kanbara et al. | 348/207.99 |
| 2010/0007946 A1* | 1/2010 | Takeuchi | 359/385 |
| 2010/0183288 A1* | 7/2010 | Kudoh | 396/55 |
| 2011/0267692 A1* | 11/2011 | Watanabe et al. | 359/557 |

FOREIGN PATENT DOCUMENTS

JP 08-179190 A 7/1996

OTHER PUBLICATIONS

Machine translation of JP 2007-193374—Noguchi.*

* cited by examiner

*Primary Examiner* — Rochelle-Ann J Blackman
*Assistant Examiner* — Linda B Smith
(74) *Attorney, Agent, or Firm* — Drinker Biddle & Reath LLP

(57) ABSTRACT

A shake correction apparatus for correcting shake of a camera includes: a lens support plate including a correction lens and driven in a perpendicular direction with respect to an optical axis; and a position fixing member that decouplably couples with the lens support plate and fixes a position of the lens support plate according to a rotation of the lens support plate. The shake correction apparatus performs a correction operation for offsetting shake when an optical image stabilization (OIS) function is turned on, and performs a centering operation for fixing the correction lens to an original position when the OIS function is turned off. The shake correction apparatus is advantageous for low power operation, being miniaturized, and being light-weighted.

20 Claims, 5 Drawing Sheets

SHAKE CORRECTION APPARATUS IN DIGITAL CAMERA

CROSS-REFERENCE TO RELATED PATENT APPLICATION

This application claims the priority benefit of Korean Patent Application No. 10-2009-0104211, filed on Oct. 30, 2009, in the Korean Intellectual Property Office, the disclosure of which is incorporated herein in its entirety by reference.

BACKGROUND

1. Field of the Invention

Embodiments relate to a shake correction apparatus in a digital camera, and more particularly, to a shake correction apparatus capable of correcting image shake caused by handshake of a user.

2. Description of the Related Art

In general, digital cameras capture an image of a subject, convert the captured image into image data, and record the image data as a file having an appropriate format. If the captured image is affected by handshake of a user or external vibration, the captured image may be blurred, thereby having low quality.

Currently, various optical image stabilization (OIS) techniques for automatically correcting camera shake have been developed. For example, a method of fixing an image-forming location on an image sensor by moving an optical lens in correspondence to camera shake has been considered. For example, a target position of the optical lens is calculated from the camera shake and feedback control is performed by using a differential signal between the target position and the current position, thereby performing a correction operation.

SUMMARY

Embodiments include a shake correction apparatus in a digital camera which performs a correction operation for offsetting shake of the digital camera when an optical image stabilization (OIS) function is turned on and performs a centering operation for fixing a correction lens to an original position when the OIS function is turned off.

Embodiments also include a shake correction apparatus in a digital camera capable of being operated in low power, being miniaturized, and being light-weighted.

According to an embodiment, a shake correction apparatus for correcting shake of a camera includes: a lens support plate including a correction lens and driven in a perpendicular direction with respect to an optical axis; and a position fixing member that decouplably couples with the lens support plate and fixes a position of the lens support plate according to a rotation of the lens support plate.

The lens support plate may include a combining member which is combined to the position fixing member.

In an embodiment, the combining member may be magnetically combined to the position fixing member. More specifically, the combining member and the position fixing member may be formed of a magnet and a yoke, respectively, where magnetic attraction occurs between the magnet and the yoke.

In another embodiment, the combining member may be mechanically combined to the position fixing member. More specifically, the combining member may include a projection pin projected from the lens support plate, and the position fixing member may include an elastic member providing a projected part that elastically holds the projection pin in position. For example, the elastic member may include a pair of plate type springs having a bend structure that face each other so as to form the elastic projected part.

The position fixing member may be disposed on a radius of rotation of the combining member.

Pairs of magnets which generate a rotation moment may be disposed at both side ends of the lens support plate with the correction lens at a center. Here, driving coils may be disposed to face the pairs of magnets, the driving coils operating in conjunction with the pairs of magnets to generate a rotation moment in one of a rotation direction and a reverse direction according to a direction of an applied current.

The shake correction apparatus may include a first pair of magnets which generate a driving force in a first axis, and a second pair of magnets which generate a driving force in a second axis, wherein the first pair of magnets and the second pair of magnets may be arranged at both sides of the correction lens, and wherein the support plate is driven in translation to a first direction as the first pair of magnets generate driving forces in a same direction, and the lens support plate may be rotatably driven as the first pair of magnets generate the driving forces in opposite directions.

The lens support plate may rotate in a tilt position so as to be combined to the position fixing member, and the lens support plate may reversely rotate so as to be separated from the position fixing member.

The correction lens may perform a centering operation for maintaining an original position on an optical axis when the lens support plate is combined to the position fixing member, and perform a correction operation by being driven on a plane perpendicular to an optical axis when the lens support plate is separated from the position fixing member.

According to another embodiment, a shake correction apparatus for correcting shake of a camera includes: a lens support plate comprising a correction lens and magnets arranged at both sides of the correction lens; a base that supports the lens support plate, the base comprising driving coils that face the magnets; and a position fixing member that decouplably couples with the lens support plate and fixes a position of the lens support plate according to a rotation of the lens support plate.

The lens support plate may include a combining member which is combined to the position fixing member. In an embodiment, the combining member and the position fixing member may be formed of a magnet and a yoke, respectively, where magnetic attraction occurs between the magnet and the yoke.

In another embodiment, the combining member may include a projection pin projected from the lens support plate, and the position fixing member may include an elastic member that provides a projected part that elastically holds the projection pin in position.

The magnets and the driving coils may rotate the lens support plate by generating a rotation moment in one of a rotation direction and a reverse direction.

The magnets may include a first pair of magnets which generate a driving force in a first axis, and a second pair of magnets which generate a driving force in a second axis; and wherein the support plate is driven in translation to a first direction as the first pair of magnets generate driving forces in a same direction, and the lens support plate may be rotatably driven as the first pair of magnets generate the driving forces in opposite directions.

The correction lens may perform a centering operation for maintaining an original position on an optical axis when the lens support plate is combined to the position fixing member, and perform a correction operation by being driven on a plane perpendicular to an optical axis when the lens support plate is separated from the position fixing member.

BRIEF DESCRIPTION OF THE DRAWINGS

The above and other features and advantages will become more apparent by describing in detail exemplary embodiments with reference to the attached drawings in which.

DETAILED DESCRIPTION

Figure 1:
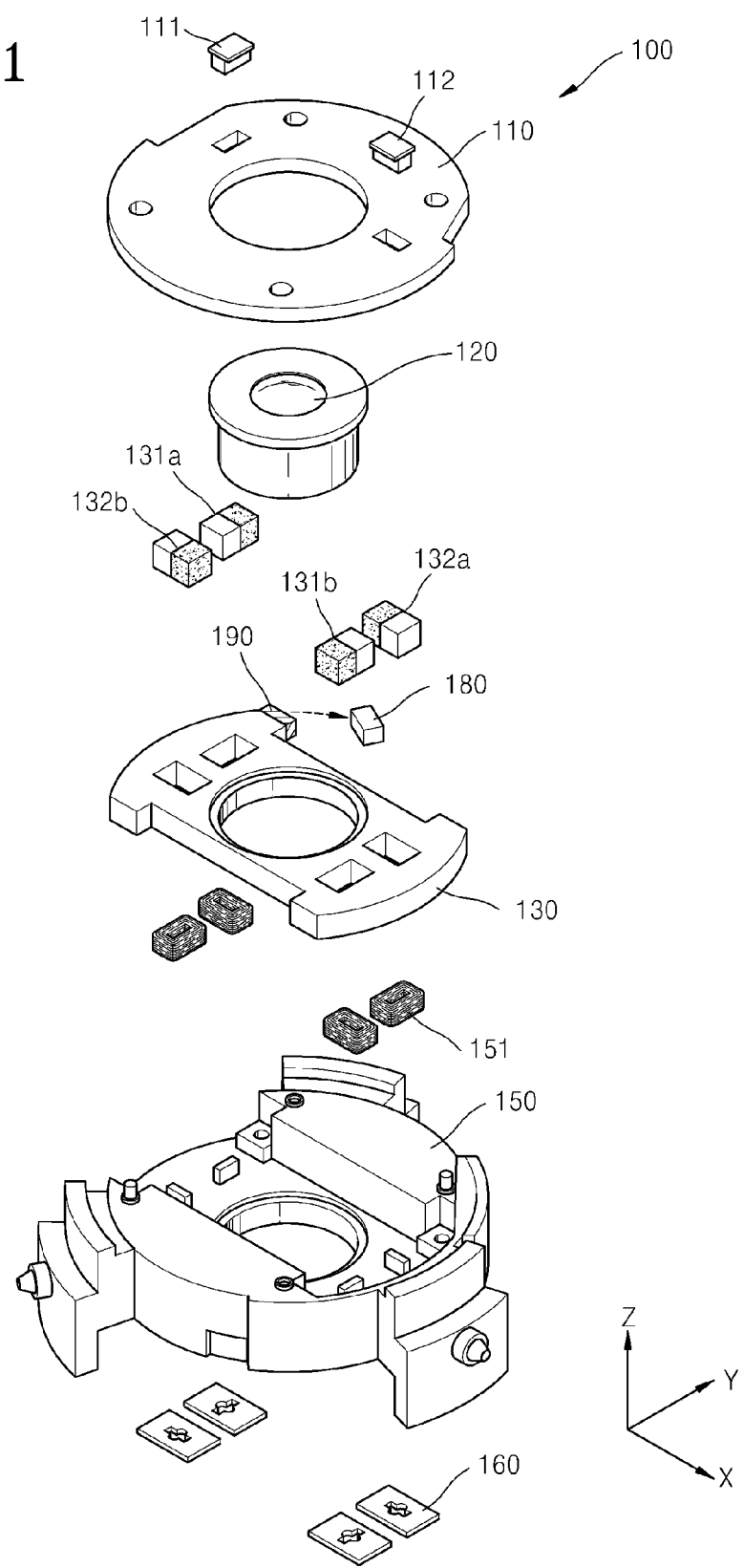
FIG. 1 is an exploded perspective view of a shake correction apparatus, according to an embodiment.
Figure 2:
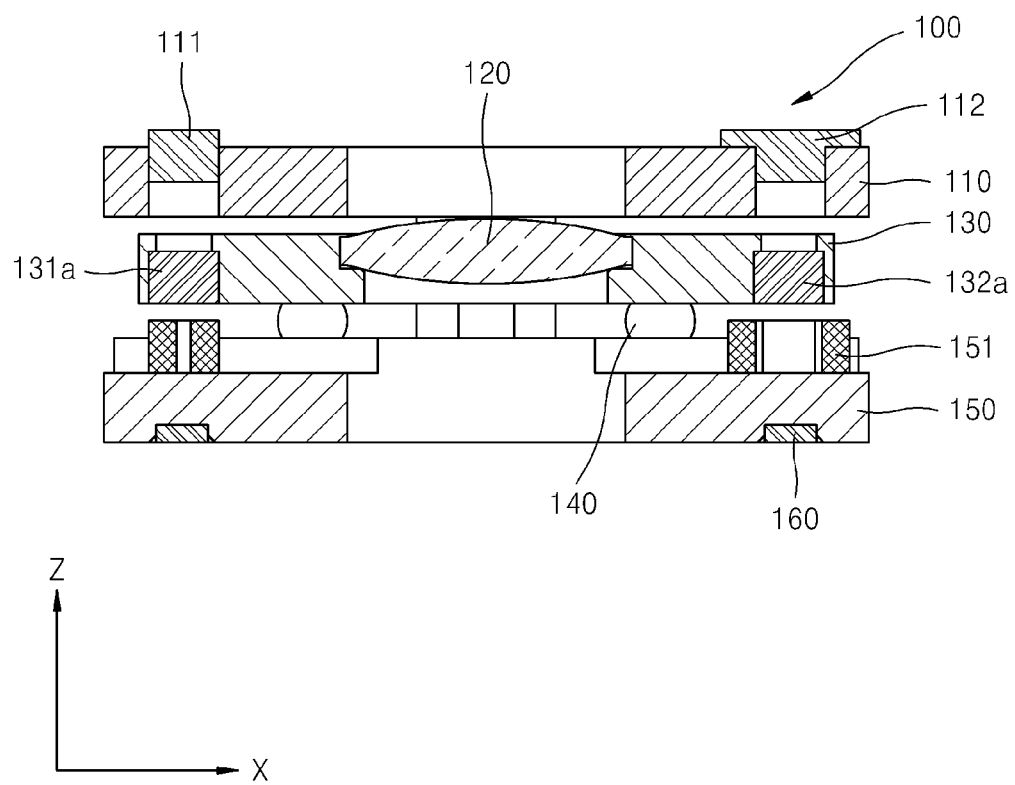
FIG. 2 is an assembled cross-sectional view of the shake correction apparatus illustrated in FIG. 1.

Hereinafter, a shake correction apparatus according to one or more embodiments will be described in detail with reference to the attached drawings. FIG. 1 is an exploded perspective view of a shake correction apparatus 100, according to an embodiment. FIG. 2 is an assembled cross-sectional view of the shake correction apparatus 100 illustrated in FIG. 1. The correction apparatus 100 includes a correction lens 120, a lens support plate 130, and a base 150 for supporting the lens support plate 130.

A first pair of magnets 131a and 131b and a second pair of magnets 132a and 132b are respectively assembled at opposite sides of the lens support plate 130, and driving coils 151 and yokes 160 are respectively assembled above and below the base 150 so as to face the magnets 131a, 131b, 132a, and 132b. For example, the driving coils 151 and the yokes 160 may be respectively assembled on a top surface and a bottom surface of the base 150 so as to face the magnets 131a, 131b, 132a, and 132b.

Since the magnets 131a, 131b, 132a, and 132b and the driving coils 151 are assembled to face each other, electromagnetic interactions occur therebetween, and thus the magnets 131a, 131b, 132a, and 132b and the driving coils 151 form a voice coil motor (VCM) actuator. Opposite ends of each of the driving coils 151 may be connected to a circuit substrate (not shown) for applying a control signal. The lens support plate 130 is driven in an X-Y axis plane perpendicular to an optical axis (Z-axis), and performs a correction operation, according to the electromagnetic interactions between the magnets 131a, 131b, 132a, and 132b and the driving coils 151.

The magnets 131a, 131b, 132a, and 132b and the yokes 160 are assembled to face each other, and exert a magnetic force with respect to each other. Thus, the lens support plate 130 and the base 150 are close to each other by the magnetic force between the magnets 131a, 131b, 132a, and 132b and the yokes 160, and when a driving power is cut off, a center of each of the magnets 131a, 131b, 132a, and 132b is matched with a center of each of the yokes 160 so as to return the lens support plate 130 to its original position. Moreover, the lens support plate 130 and the base 150 are disposed to face each other with ball bearings 140 (see FIG. 2) interposed therebetween. Thus, the lens support plate 130 supported by the base 150 via the ball bearings 140 is moved in the X-Y axis plane.

A cover 110 may be disposed on a top part of the handshake correction apparatus 100. The cover 110 is assembled above the base 150 with the lens support plate 130 interposed between the cover 110 and the base 150. Hall sensors 111 and 112 are assembled in the cover 110 so as to detect the position of the correction lens 120. The hall sensors 111 and 112 are positioned to face the magnets 131a, 131b, 132a, and 132b, and sense changes in magnetic fields of the magnets 131a, 131b, 132a, and 132b, thereby enabling detection of displacement of the correction lens 120, when moved together with the magnets 131a, 131b, 132a, and 132b.

Figure 3:
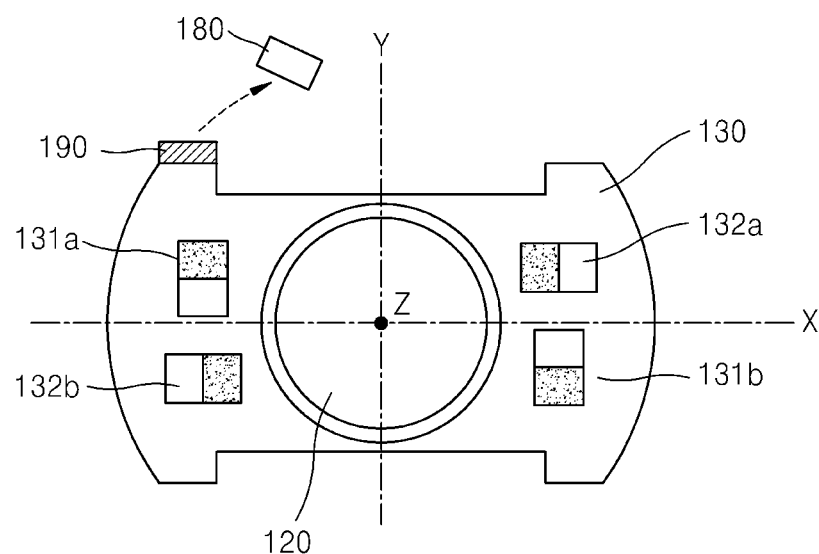
FIG. 3 is a plan view of a lens support plate to which magnets are assembled, according to an embodiment.

FIG. 3 is a plan view of the lens support plate 130 to which the magnets 131a, 131b, 132a, and 132b are assembled, according to an embodiment. Referring to FIG. 3, the correction lens 120 may be assembled as a center of the lens support plate 130. The first pair of magnets 131a and 131b and the second pair of magnets 132a and 132b are arranged to be symmetrically disposed with respect to the correction lens 120. The first pair of magnets 131a and 131b provide a driving force in a first axis (Y-axis) direction and have opposite polarities disposed along the first axis (Y-axis) direction. Electromagnetic interaction occurs between the first pair of magnets 131a and 131b and the driving coils 151 disposed to face the first pair of magnets 131a and 131b. The first pair of magnets 131a and 131b move to a positive/negative direction of the first axis (Y-axis) according to a direction of applied current flowing to the driving coils 151.

Similarly, the second pair of magnets 132a and 132b provide a driving force in a second axis (X-axis) direction and have opposite polarities disposed along the second axis (X-axis) direction. Electromagnetic interaction occurs between the second pair of magnets 132a and 132b and the driving coils 151 disposed to face the second pair of magnets 132a and 132b. The second pair of magnets 132a and 132b move to a positive/negative direction of the second axis (X-axis) according to a direction of applied current flowing to the driving coils 151. As illustrated in FIG. 3, the first pair of magnets 131a and 131b and the second pair of magnets 132a and 132b each may be arranged in a cross direction with respect to the correction lens 120.

The first and second pairs of magnets 131a, 131b, 132a, 132b move the correction lens 120 to a target position for offsetting shake of a camera while moving together with the correction lens 120 in the plane defined by the first axis and the second axis (the X-Y axis plane), thereby performing a correction operation for optical image stabilization (OIS).

Figure 4:
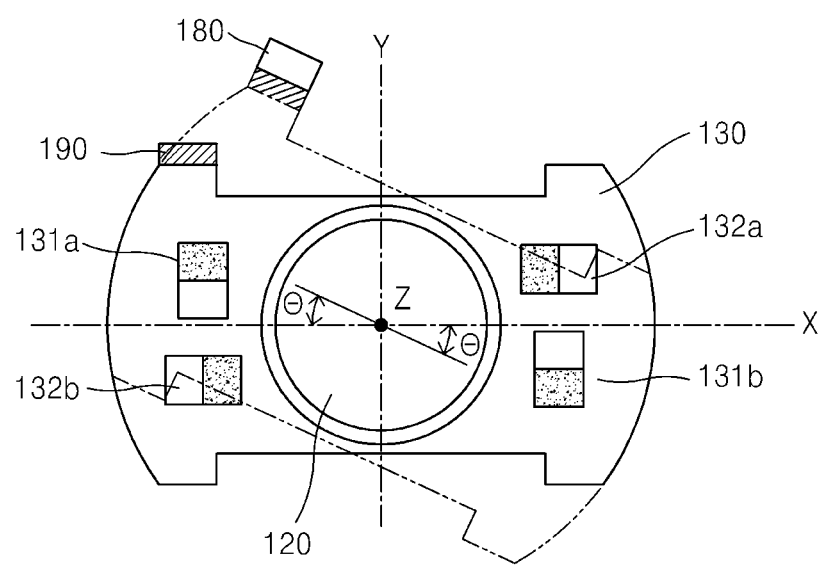
FIG. 4 is a plan view of a lens support plate to which a position fixing member is combined according to rotation of the lens support plate of FIG. 3, according to an embodiment.

FIG. 4 is a plan view of a lens support plate 130 to which a position fixing member 180 is combined according to rotation of the lens support plate 130 of FIG. 3, according to an embodiment. The position fixing member 180 is disposed near the lens support plate 130 for restricting the lens support plate 130 to an original position. As illustrated in FIG. 4, the position fixing member 180 combines with a combining member 190, which moves near the position fixing member 180 by rotation of the lens support plate 130 so that the position fixing member 180 temporarily fixes the position of the lens support plate 130 and prevents the lens support plate 130 being moved. The term "temporarily fix" denotes that while the lens support plate 130 is combined to the position fixing member 180 by a predetermined angle θ in a rotated position, the lens support plate 130 is restricted to an original position until the lens support plate 130 reversely rotates and is separated from the position fixing member 180. The combining member 190 may be installed at the corner edge of the lens support plate 130 which is accompanied with relatively high displacement when the lens support plate 130 rotates. The position fixing member 180 may be installed on a radius of rotation of the combining member 190.

For example, the combining member 190 in the lens support plate 130 may be formed of a magnet and the position fixing member 180 may be formed of a yoke member, which is a magnetic substance so as to magnetically combine to the combining member 190. As the lens support plate 130 rotates to one direction, the combining member 190 may be magnetically combined with the position fixing member 180 and the lens support plate 130 may be fixed to its original position. In this case, as the lens support plate 130 is reversely rotated, the combining member 190 is separated from the position fixing member 180, thereby allowing a correction operation of the lens support plate 130.

As the lens support plate 130 is fixed to the original position, a centering operation, by which an optical center of the correction lens 120 is arranged on an optical axis (Z-axis), is performed and an artificial correction operation for offsetting shake of a camera is not allowed. Both centering operation and correction operation are performed for correction lens 120 and thus are each exclusive. The centering operation and the correction operation may not be performed at the same time.

For example, the centering operation/correction operation may be selectively performed based on an input signal by a user for on/off of an OIS mode. When the OIS function is turned off, the centering operation which regularly fixes the position of the correction lens 120 is performed in spite of a movement of a user and an external shock. Since a combination of the position fixing member 180 is used in the centering operation, a shake correction apparatus, which is advantageous to be operated in low power, miniaturized, and light-weighted, may be provided, compared with a prior apparatus which needs driving power for fixing the position of a correction lens and requires an additional installation space for a separate fixing apparatus.

Figure 5:
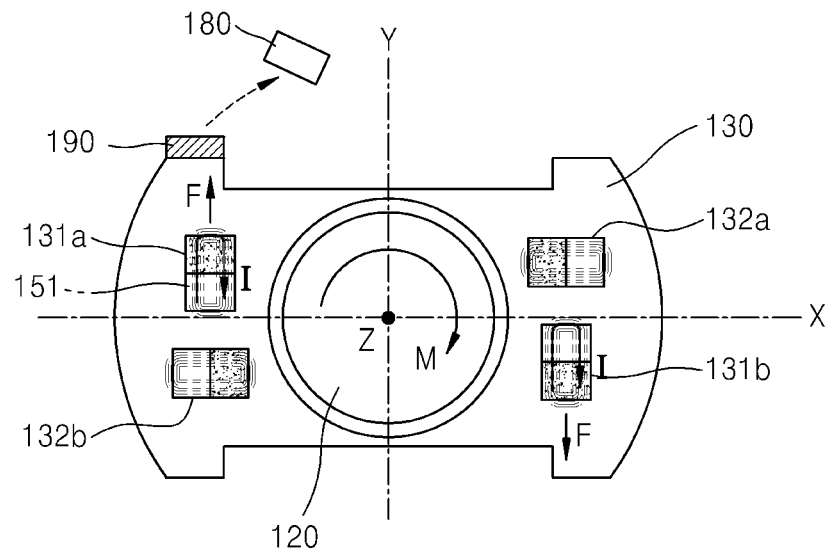
FIGS. 5 and 6 are plan views of a lens support plate showing a rotation moment generated to the lens support plate according to a direction of current applied to driving coils, according to an embodiment.
Figure 6:
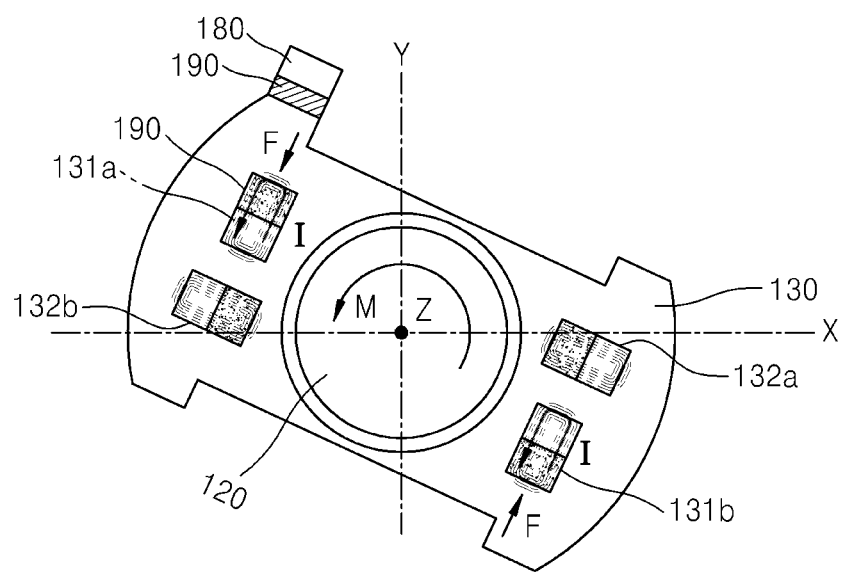

FIGS. 5 and 6 are plan views of a lens support plate 130 showing a rotation moment M generated to the lens support plate 130 according to a direction of current I applied to driving coils 151, according to an embodiment. As illustrated in FIG. 5, if an applied current I flows in the driving coils 151 in a clockwise direction, wherein the driving coils 151 face the first pair of magnets 131*a* and 131*b*, a force F is generated in a first direction at the magnet 131*a*, while a force F is generated in a second different direction at the magnet 131*b*, and the forces F combine to create a clockwise rotation moment M. Since the lens support plate 130 rotates in one direction based on the rotation moment M, the combining member 190 moves near to the position fixing member 180 and is combined to the position fixing member 180 (centering operation). In this condition, as illustrated in FIG. 6, a force F is generated in a first direction at the magnet 131*a*, while a force F is generated in a second different direction at the magnet 131*b*, and the forces F combine to create a counter-clockwise rotation moment M. Since the lens support plate 130 reversely rotates based on the rotation moment M, the combining member 190 is separated from the position fixing member 180 (correction operation). As such, a driving source of the shake correction apparatus may be used to control a driving mode of the correction lens 120.

The combining member 190 of the lens support plate 130 is magnetically combined to the position fixing member 180. In another embodiment, the combining member 190 may be mechanically combined to the position fixing member 180.

Figure 7:
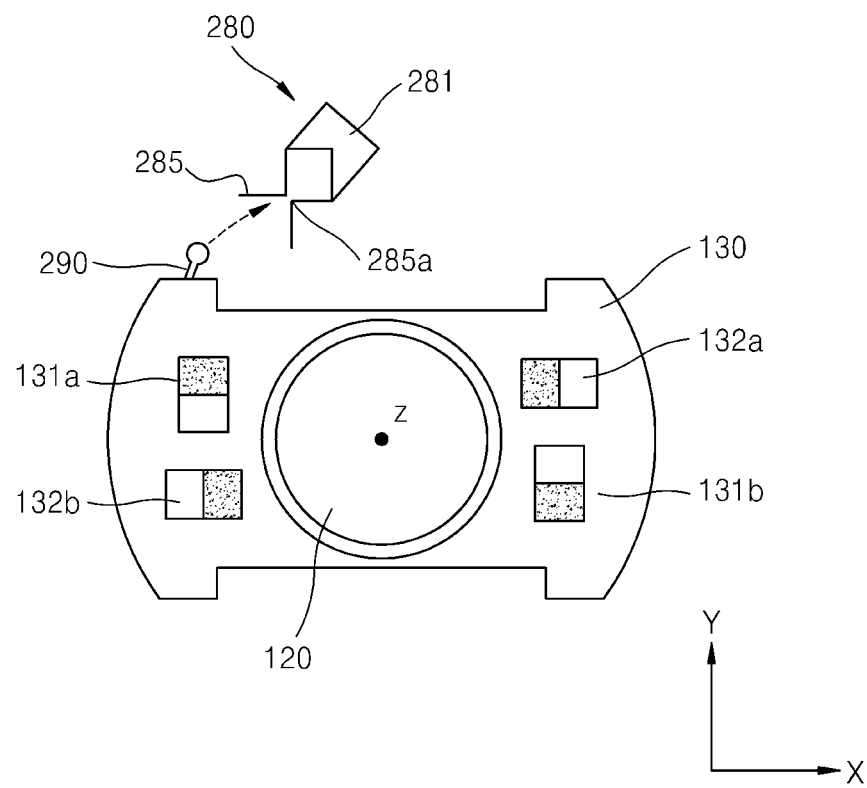
FIGS. 7 and 8 are views of a modified position fixing member and combining member, according to an embodiment.
Figure 8:
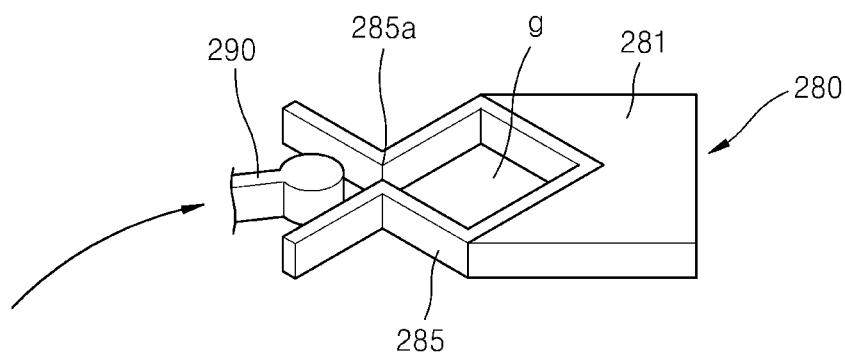

FIGS. 7 and 8 are views of a modified position fixing member 280 and combining member 290, according to an embodiment. Referring to FIGS. 7 and 8, the combining member 290 may be installed at the corner edge of the lens support plate 130 which is accompanied with relatively high displacement when the lens support plate 130 rotates. The combining member 290 may be a circular-shape projection pin projected from the lens support plate 130. The position fixing member 280 disposed on a radius of rotation of the combining member 290 includes a pair of plate type springs 285 arranged to face each other and a support 281 for structurally supporting the springs 285. The plate type springs 285 have a bend structure so as to provide an elastic projected part 285*a*. The elastic projected part 285*a* may have a low elastic force that is sufficient for allowing entry of the combining member 290 due to the rotation of the lens support plate 130. Also, the elastic projected part 285*a* may have a great elastic force that is sufficient for obstructing an arbitrary separation of the combining member 290 once entered into the position fixing member 280. That is, once the combining member 290 enters into an internal space g interposed between the plate type springs 285, the projected part 285*a* may prevent the combining member 290 from going outside the internal space g.

Since the lens support plate 130 rotates in one direction, the combining member 290 moves near the position fixing member 280 disposed on a radius of rotation and is mechanically combined to the position fixing member 280. For example, the combining member 290 elastically expands the projected part 285*a* and thus the combining member 290 is kept in the internal space g interposed between the plate type springs 285. Also, since the lens support plate 130 is reversely rotated, the combining member 290 elastically expands the projected part 285*a* and goes outside so that the combining member 290 is separated from the position fixing member 280. Here, as described with reference to FIGS. 5 and 6, the lens support plate 130 may be rotated by using electromagnetic interaction between the first pair of magnets 131*a* and 131*b* and the driving coils 151 and by generating a rotation moment.

The shake correction apparatus 100 may be installed in a barrel structure including a protruding-type barrel structure, in which a barrel assembly is in/out thereof according to an on/off state of a camera, and a winding barrel structure, in which an optical system arranged perpendicular to an incident direction of a subject image is included.

According to embodiments of the shake correction apparatus, a correction operation for offsetting shake of a camera is performed when the OIS function is turned on and a centering operation for fixing the correction lens to an original position is performed when the OIS function is turned off.

Since a combination of the position fixing member is used in the centering operation, the shake correction apparatus, which is advantageous to be operated in low power, miniaturized, and light-weighted, may be provided without consuming driving power for fixing the position of the correction lens and requiring an additional installation space for a separate fixing apparatus.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". It will be recognized that the terms "comprising," "including," and "having," as used herein, are specifically intended to be read as open-ended terms of art.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

What is claimed is:

1. A shake correction apparatus for correcting shake of a camera, the apparatus comprising:
    a lens support plate comprising a correction lens and driven in a perpendicular direction with respect to an optical axis; and
    a position fixing member that decouplably couples with the lens support plate and fixes a position of the lens support plate according to a rotation of the lens support plate.

2. The apparatus of claim 1, wherein the lens support plate comprises a combining member which is combined to the position fixing member.

3. The apparatus of claim 2, wherein the combining member is magnetically combined to the position fixing member.

4. The apparatus of claim 3, wherein the combining member and the position fixing member are formed of a magnet and a yoke, respectively, where magnetic attraction occurs between the magnet and the yoke.

5. The apparatus of claim 2, wherein the combining member is mechanically combined to the position fixing member.

6. The apparatus of claim 5, wherein the combining member comprises a projection pin projected from the lens support plate, and the position fixing member comprises an elastic member providing an elastic projected part that elastically holds the projection pin in position.

7. The apparatus of claim 6, wherein the elastic member comprises a pair of plate type springs having a bend structure that face each other so as to form the elastic projected part.

8. The apparatus of claim 2, wherein the position fixing member is disposed on a radius of rotation of the combining member.

9. The apparatus of claim 1, further comprising pairs of magnets which generate a rotation moment, the pairs of magnets disposed at both side ends of the lens support plate with the correction lens at a center.

10. The apparatus of claim 9, further comprising driving coils disposed to face the pairs of magnets, the driving coils operating in conjunction with the pairs of magnets to generate a rotation moment in one of a rotation direction and a reverse direction according to a direction of an applied current.

11. The apparatus of claim 1, further comprising:
    a first pair of magnets which generate a driving force in a first axis, and
    a second pair of magnets which generate a driving force in a second axis,
    wherein the first pair of magnets and the second pair of magnets are arranged at both sides of the correction lens, and
    wherein the support plate is driven in translation to a first direction as the first pair of magnets generate driving forces in a same direction, and the lens support plate is rotatably driven as the first pair of magnets generate the driving forces in opposite directions.

12. The apparatus of claim 1, wherein the lens support plate rotates in a tilt position so as to be combined to the position fixing member, and the lens support plate reversely rotates so as to be separated from the position fixing member.

13. The apparatus of claim 1, wherein the correction lens performs a centering operation for maintaining an original position on an optical axis when the lens support plate is combined to the position fixing member, and performs a correction operation by being driven on a plane perpendicular to an optical axis when the lens support plate is separated from the position fixing member.

14. A shake correction apparatus for correcting shake of a camera, the apparatus comprising:
  a lens support plate comprising a correction lens and magnets arranged at both sides of the correction lens;
  a base that supports the lens support plate, the base comprising driving coils that face the magnets; and
  a position fixing member that decouplably couples with the lens support plate and fixes a position of the lens support plate according to a rotation of the lens support plate.

15. The apparatus of claim 14, wherein the lens support plate comprises a combining member which is combined to the position fixing member.

16. The apparatus of claim 15, wherein the combining member and the position fixing member are formed of a magnet and a yoke, respectively, where magnetic attraction occurs between the magnet and the yoke.

17. The apparatus of claim 15, wherein the combining member comprises a projection pin projected from the lens support plate, and the position fixing member comprises an elastic member that provides a projected part that elastically holds the projection pin in position.

18. The apparatus of claim 14, wherein the magnets and the driving coils rotate the lens support plate by generating a rotation moment in one of a rotation direction and a reverse direction.

19. The apparatus of claim 14, wherein the magnets include:
  a first pair of magnets which generate a driving force in a first axis, and
  a second pair of magnets which generate a driving force in a second axis; and wherein
  the lens support plate is driven in translation to a first direction as the first pair of magnets generate driving forces in a same direction, and the lens support plate is rotatably driven as the first pair of magnets generate the driving forces in opposite directions.

20. The apparatus of claim 14, wherein the correction lens performs a centering operation for maintaining an original position on an optical axis when the lens support plate is combined to the position fixing member, and performs a correction operation by being driven on a plane perpendicular to an optical axis when the lens support plate is separated from the position fixing member.

* * * * *